(12) United States Patent
Bonola et al.

(10) Patent No.: US 6,898,646 B1
(45) Date of Patent: May 24, 2005

(54) HIGHLY CONCURRENT DMA CONTROLLER WITH PROGRAMMABLE DMA CHANNELS

(75) Inventors: Thomas J. Bonola, Magnolia, TX (US); Robert D. Herrington, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/564,341

(22) Filed: May 3, 2000

(51) Int. Cl.[7] .............................. G06F 3/00; G06F 13/00
(52) U.S. Cl. .............................. 710/22; 710/23; 710/38; 710/52
(58) Field of Search .............................. 710/22, 23, 38, 710/52

(56) References Cited

U.S. PATENT DOCUMENTS 4,864,601 A  *  9/1989  Berry ...................... 379/93.07
5,809,335 A  *  9/1998  Kamiya ...................... 710/22
5,875,351 A  *  2/1999  Riley ...................... 710/22

OTHER PUBLICATIONS

IMB Technical Disclosure Bulletin, "Direct Memory Access Channel Sharing Mechanism", Dec. 1987, vol. # 30, Issue # 7, pp. 369–370.*

* cited by examiner

Primary Examiner—Tammara Peyton (57) ABSTRACT

A data transaction controller for transferring data responsive to a request from a client. The data transaction controller includes channel circuitry for providing a channel for data transfers. The channel circuitry includes a first storage device for storing channel configuration data. The data transaction controller further includes control circuitry for controlling access by the client to the channel circuitry.

28 Claims, 6 Drawing Sheets

HIGHLY CONCURRENT DMA CONTROLLER WITH PROGRAMMABLE DMA CHANNELS

FIELD OF THE INVENTION

The invention relates generally to computer systems, and more particularly, but not by way of limitation, to computer systems and computer system components for conducting data transfer transactions without intimate microprocessor involvement.

BACKGROUND OF THE INVENTION

Computer systems have become an integral part of many homes and businesses. The more popular that computers become, the more demands that are placed upon them. For example, computer systems have become highly integrated into most businesses. These businesses depend upon their computer systems to be accurate, fast and reliable. Down time caused by system crashes and slow response times results in expensive losses, including losses in employee productivity. Accordingly, computer system designers must design components and entire systems with speed and reliability in mind.

Computer system designers have long realized that the microprocessor is instrumental to the overall performance of the computer system. In many cases, improvements in system performance are the direct result of improvements in the microprocessor. That is, the computer system performance is increased because of improvements in the microprocessor that, for example, allow it to handle more instructions in the same time period. In other cases, however, improvements in system performance are the direct result of relieving the microprocessor of certain time-intensive duties. These certain time-intensive duties are often shifted to other circuitry.

For example, instead of requiring the microprocessor to handle time-intensive data transfers, computer system designers have assigned certain data transfer control to specialized circuitry known as direct memory access (DMA) controllers. Generally, DMA controllers only need to know the base location of where data is to be moved from, the address to where the data should go, and the amount of data to be moved. Once the DMA controller knows this information, it will move the data without intimate microprocessor intervention. Without a DMA controller, the microprocessor itself would be forced to control the data transfer—thereby resulting in substantially decreased system performance.

Original DMA controllers are generally inadequate for modern computer systems and have been essentially abandoned. Instead of the original, dedicated DMA controllers, modern computer systems often use bus masters to perform DMA type transactions. For clarity, original, dedicated DMA controllers and bus masters that perform DMA type transactions will be referred to, collectively, as "DMA controllers." Existing DMA controllers, however, are plagued by problems and limitations. Both present and future computer systems are in need of a next generation DMA controller.

One problem with existing DMA controllers is the lack of standardization and the resulting complexity caused by this lack of standardization. Existing DMA controllers are designed and manufactured by a variety of vendors—each vendor having its own design features. In terms of DMA transactions, each vendor has its own way of rendering DMA transactions. Each DMA controller, accordingly, must have its own driver running in kernel mode. This multitude of drivers adds unneeded complexity to the computer system and causes DMA capabilities to be under-utilized.

As previously noted, DMA controllers require a driver running at kernel mode, which is a higher privilege (security) level than is, for example, the application mode used by user programs. Because DMA controllers require a driver running at kernel mode, a user application, which should not have access to the higher privilege level, cannot easily access existing DMA drivers and take advantage of DMA capabilities. In other words, a user application can generally only take full advantage of DMA capabilities with the help of the operating system (OS). The OS must transition the application from a lesser privilege level into a higher privilege level. The OS, for example, must transition the application from the untrusted domain where user applications operate to a trusted domain where drivers operate.

By allowing user applications access to the trusted domain, the integrity of the entire computer system is jeopardized. The user application, if given access to the trusted domain, could destroy or alter the OS, destroy data, crash the system, etc. Accordingly, a well designed computer system will strictly limit a user application's access to the trusted domain. When the access of a user application to the trusted domain is limited, however, the ability of the user application to utilize the features of existing DMA controllers is also limited—thereby forcing the microprocessor to perform data transfers that are better performed by a DMA controller.

In light of the deficiencies in the existing technology, a next generation DMA controller is needed.

More particularly, a DMA controller is needed that permits user applications to render DMA transactions without compromising computer system integrity. Further, a DMA controller is needed that allows user applications to render DMA transactions without intimate OS intervention. Additionally, a DMA controller is needed that allows access by both host processors and non-host processor devices to dynamically acquire and release DMA channels.

SUMMARY OF THE INVENTION

To remedy the deficiencies of existing technology, the present invention provides a method and apparatus for efficiently performing data transfers, such as DMA transactions, for various types of clients without jeopardizing system integrity.

In one embodiment, the present invention includes a computer system comprising a mass storage device; and a first data transfer controller for controlling data transfers involving the mass storage device, wherein the first data transfer controller is operable in a channel free state and a channel unavailable state. This embodiment further includes a circuit device connected to the first data transfer controller, the circuit device is at least for requesting a particular data transfer to be controlled by the first data transfer controller; and a second data transfer controller connected to the circuit device, the second data transfer controller for controlling data transfers and for controlling the particular data transfer responsive, at least, to the circuit device receiving an indication that the first data controller is in the channel unavailable state.

BRIEF DESCRIPTION OF THE DRAWINGS

A more complete understanding of the present invention may be had by reference to the following Detailed Description and appended claims when taken in conjunction with the accompanying drawings wherein:

DETAILED DESCRIPTION OF THE PRESENTLY PREFERRED EMBODIMENT OF THE INVENTION

Although the present invention is open to various modifications and alternative constructions, a preferred exemplary embodiment that is shown in the drawings will be described herein in detail. It is to be understood, however, that there is no intention to limit the invention to the particular forms disclosed. One skilled in the art will recognize that there are numerous modifications, equivalences and alternative constructions that fall within the spirit and scope of the invention as expressed in the claims.

Figure 1:
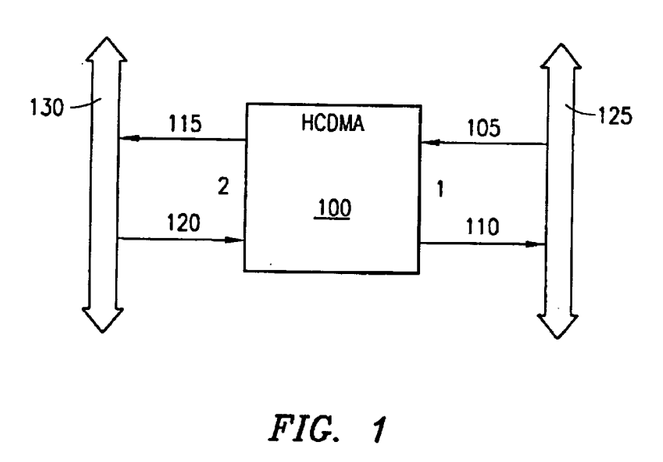
FIG. 1 illustrates a highly concurrent direct memory access (HCDMA) controller in accordance with the principles of the present invention.

Referring now to FIG. 1, there is illustrated a highly concurrent direct memory access (HCDMA) controller 100 constructed in accordance with the principles of the present invention. The HCDMA controller 100 includes data lines: input 105 and output 110. These data lines define side 1 of the HCDMA controller 100. Additionally, the HCDMA controller 100 includes data lines: input 120 and output 115. These data lines define side 2 of the HCDMA controller 100.

The data lines on side 1 of the HCDMA are connected to a data bus 125. Similarly, the data lines of side 2 of the HCDMA are connected to a data bus 130. Although the data lines of side 1 and side 2 are shown to not be multiplexed, one skilled in the art can understand that multiplexing circuitry can be inserted intermediate the HCDMA controller 100 and either data bus 125 or data bus 130. Accordingly, the HCDMA controller 100 is compatible with any type of bus.

Figure 2:
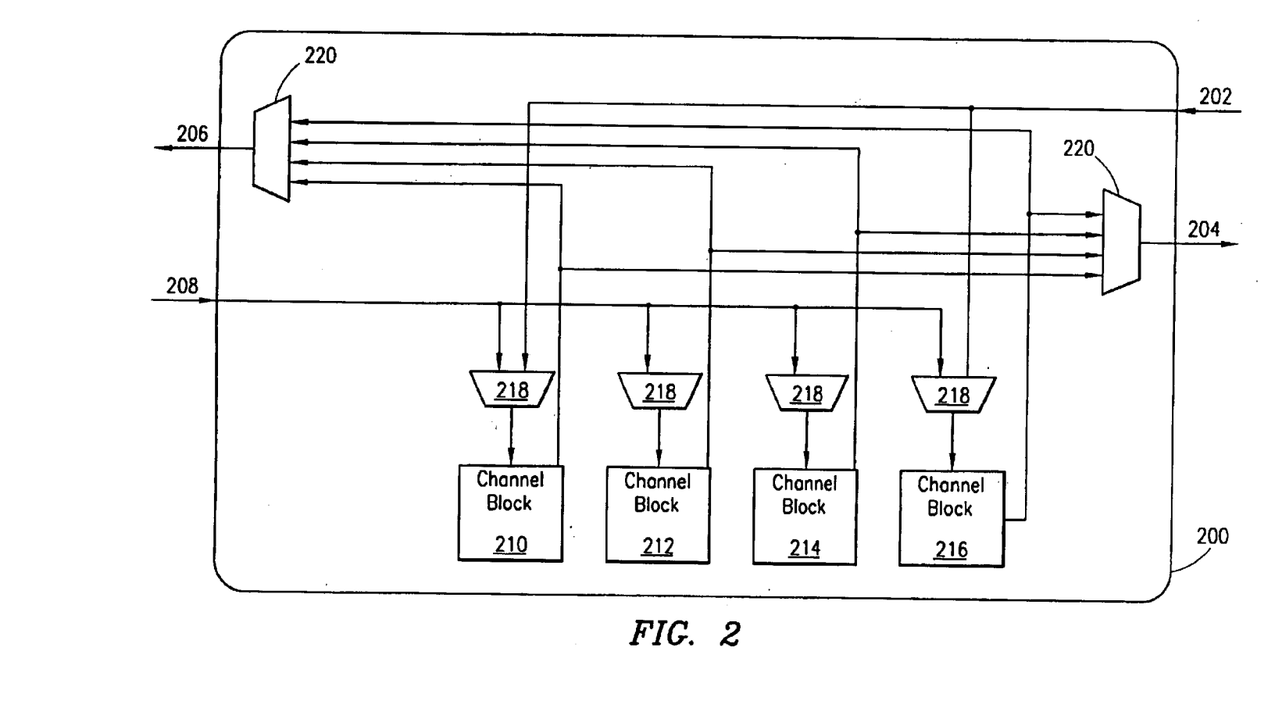
FIG. 2 illustrates in more detail the HCDMA controller as similarly shown in FIG. 1.

Referring now to FIG. 2, there is illustrated a more detailed depiction of a HCDMA controller 200. As can be appreciated, the inputs 202 and 208 generally correspond to the inputs 105 and 120 of FIG. 1, and furthermore the outputs 204 and 206 generally correspond to the outputs 110 and 115 of FIG. 1. HCDMA controller 200 includes multiplexers 220 and 218 that are used to control the I/O to and from the inputs 202 and 208 and the outputs 204 and 206.

Still referring to FIG. 2, the HCDMA controller 200 includes a control block 210 and multiple channel blocks such as channel blocks 212, 214 and 216. Although HCDMA controller 200 is illustrated to include only three channel blocks 212, 214, 216, one skilled in the art can appreciate that any number of channel blocks (including only one) can be incorporated into the HCDMA controller 200. The number of channel blocks in any particular HCDMA controller is a function of the available silicon and the number of DMA channels need for an envisioned implementation.

Each channel block of the HCDMA controller 200 supports one DMA channel and each channel block is independently programmable. HCDMA controller 200, accordingly, supports three DMA channels and each of these channels can be simultaneously acquired, held, programmed and used by different clients such as host software and bus master devices.

Once a DMA channel supported by a channel block is acquired, the acquiring client can program the DMA channel to execute DMA transactions. Until that client concludes all of its DMA transaction and releases the DMA channel, no other client can use that particular DMA channel. Other clients must acquire a different DMA channel from a different channel block.

To acquire a DMA channel from a HCDMA controller, such as HCDMA controller 200, a client must communicate with the control block 210. For example, the client can request a free channel block from the control block 210, i.e., the client can request a DMA channel not being used by another client. If the HCDMA controller 200 has a free DMA channel, the HCDMA controller 200 will indicate this to the requesting client. If, on the other hand, the HCDMA controller 200 does not have a free DMA channel, this fact will be communicated to the client and the client will either wait for a DMA channel to become free or seek a DMA channel from another HCDMA controller.

When the client completes all of its DMA transactions, it should signal the control block that the DMA channel is no longer needed. After being signaled by the client, the control block can release the DMA channel. That control block and associated DMA channel can then be acquired by other clients. As can be appreciated by one skilled in the art, by acquiring and releasing DMA channels through a control block such as control block 210, multiple clients can simultaneously acquire and release DMA channels without operating system (OS) intervention.

Figure 3:
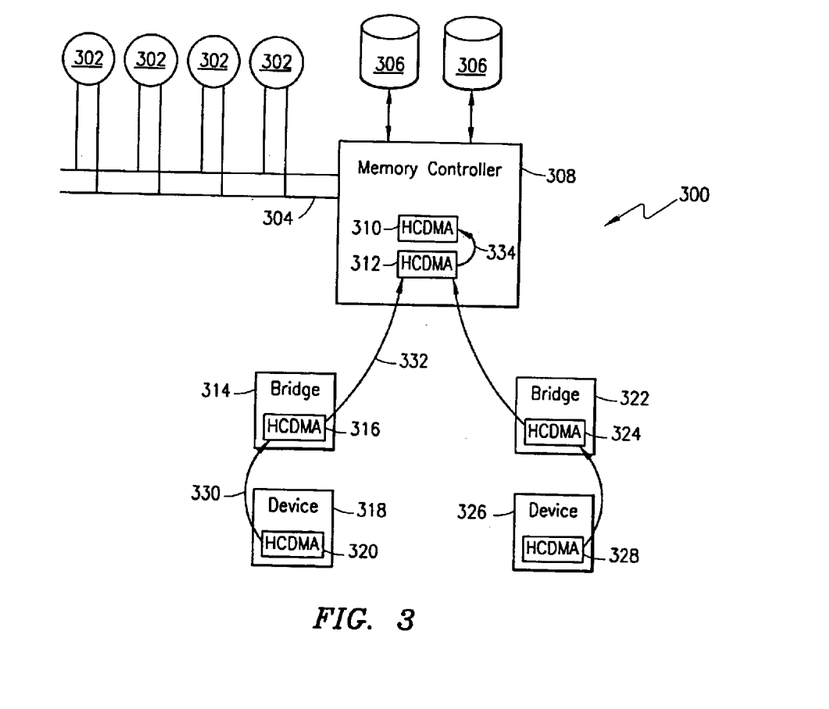
FIG. 3 illustrates a computer system including multiple, chained HCDMA controllers.

In another embodiment of the present invention, multiple, distributed HCDMA controllers can be linked (chained) so that each HCDMA controller's DMA channels are pooled. Thus, if one HCDMA controller does not have a free DMA channel, a client can obtain a DMA channel from another HCDMA controller. FIG. 3 illustrates an exemplary computer system 300 that includes multiple, chained HCDMA controllers.

In FIG. 3, the computer system 300 includes processors 302 connected with a memory controller 308 by a bus 304. The memory controller 308 controls all transactions with memory devices 306. These memory devices 306 can include single storage units, electronic memory, distributed memory systems, RAID systems, etc. Furthermore, the memory controller 308 controls all transactions between memory devices 306 and device 318, device 326, bridge 314 and bridge 326. Devices 318 and 326 can be virtually any computer component, including bus masters, ASICs, I/O devices, bridges, etc. Furthermore, the memory controller 308 controls all transactions between the memory devices 306 and the processors 302. Although processors 302 are illustrated as including four processors, one skilled in the art can understand that any number of processors, including one, can be used in the computer system 300.

Still referring to FIG. 3, I/O bridge 314, I/O bridge 322, device 318 and device 326 include HCDMA controllers 316, 324, 320 and 328, respectively. Further, the memory controller 308 includes HCDMA controllers 310 and 312. It is not necessary, however, that each of the I/O bridges, devices, and the memory controller include a HCDMA controller.

One skilled in the art can appreciate that FIG. 3 is only exemplary and that components and/or HCDMA controllers can be added or removed without altering the basic operation of the invention.

Still referring to FIG. 3, the arrows pointing from one HCDMA controller to another HCDMA controller indicate the chaining capabilities of HCDMA controllers constructed in accordance with the principles of the present invention. For example, arrow 330 indicates that HCDMA controller 320 is chained to HCDMA controller 316 and arrow 332 indicates that HCDMA controller 316 is chained to HCDMA controller 312. Accordingly, the DMA channels of HCDMA controllers 320, 316 and 312 can be pooled together. That is, if HCDMA controller 320, for example, has no DMA channels available for acquisition, a client can, instead, acquire a DMA channel from HCDMA controller 316, which is chained to HCDMA controller 320.

More particularly, a client can attempt to acquire a DMA channel from HCDMA controller 320. If the HCDMA controller 320 has a free DMA channel as indicated by its control block (not shown), the HCDMA controller 320 returns the address of that free DMA channel to the client. The client then uses that address to set up the associated channel block such as channel block 212 in FIG. 2. If, on the other hand, the HCDMA controller 320 has no free DMA channels, the HCDMA controller returns the address of the chained HCDMA controller 316. The client, using the returned address of HCDMA controller 316, requests a DMA channel from this new HCDMA controller 316. If HCDMA controller 316 has a free DMA channel, it returns the address of that DMA channel. Otherwise, the HCDMA controller 316 returns the address of chained HCDMA controller 312. As can be appreciated, the client can continue to "walk" the chain until it finds a HCDMA controller with a free DMA channel. Further, the client can "walk" the chain of HCDMA controllers without the intervention of the OS. Accordingly, non-host based entities, such as bus masters, can acquire DMA channels.

Figure 4:
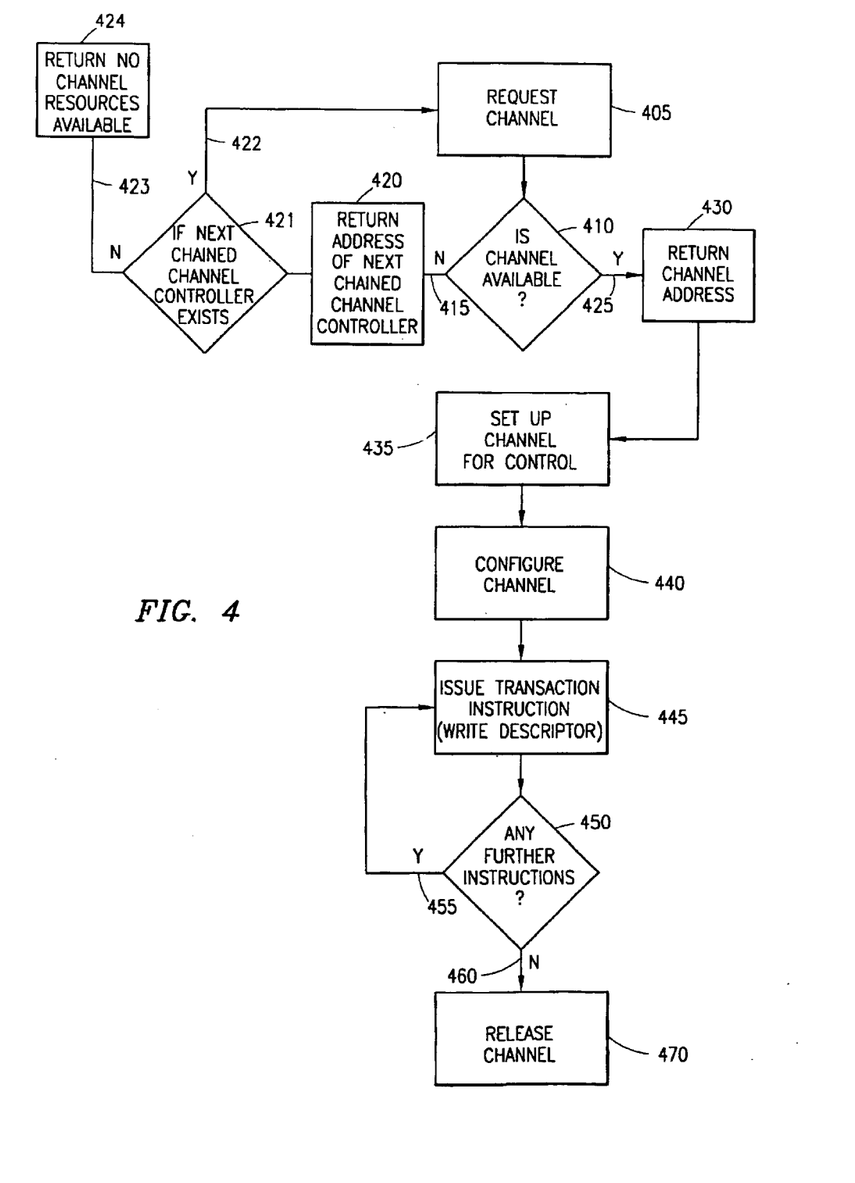
FIG. 4 is a flow chart illustrating HCDMA operation from a client-side perspective.

Referring to FIG. 4, there is illustrated the general process followed by a client to perform DMA transactions. First, the client requests a DMA channel from a particular HCDMA controller (step 405). The client, for example, can access a channel pool list stored in the control block 210 of HCDMA controller 200 (shown in FIG. 2). The channel pool list can store the addresses of the free DMA channels associated with HCDMA controller 200. Thus, when the channel pool list is empty, HCDMA controller 200 has no free DMA channels.

If, in step 410 it is determined that the HCDMA controller has no free DMA channels, branch 415 is followed and the HCDMA controller returns the address of the next chained HCDMA controller (step 420). The address of the chained HCDMA controller can be stored in the control block 210 of HCDMA controller 200 (shown in FIG. 2).

If a next chained channel controller exists (step 421) then branch 422 is followed and the client requests a free DMA channel from the next chained HCDMA controller (step 405). Otherwise, branch 423 is followed and the client is notified that no channel resources are presently available (step 424).

Assuming that the chained HCDMA controller has a free DMA channel, branch 425 is followed from decision block 410 and the HCDMA controller returns and the client receives (step 430) the address of the free DMA channel. At this point, the client has successfully acquired a DMA channel.

The client next sets up the acquired DMA channel for control (step 435). Table 1 includes exemplary control instructions that can be used to set up a DMA channel for control. The "bits" column in Table 1 indicates the offset for each instruction embedded in an exemplary 64 bit instruction. The size of the instruction, the offsets, and the individual instructions as shown in Table 1 are not meant to be limiting. Other individual instructions, offsets and bit lengths may be employed in setting up the DMA channel.

TABLE 1

CONTROL INSTRUCTIONS FOR SETTING UP DMA CHANNEL

| Bits | Access | Description |
|---|---|---|
| 53:0 | r | Ignored. |
| 0 | W | 0 = Ignored.<br>1 = RESET. Resets the channel 'GO' terminates this state. |
| 1 | W | 0 = Ignored.<br>1 = CONFIGURE. Places the channel in the Configure state. 'GO' terminates this state. |
| 2 | W | 0 = Ignored.<br>1 = PURGE. Purges this channel of all outstanding descriptors. 'GO' terminates this state. |
| 3 | W | 0 = Ignored.<br>1 = FLUSHTLB. Flushes the channel's TLB cache. |
| 4 | W | 0 = Ignored.<br>1 = INTERRUPTACK. Clears the interrupt asserted by the channel. |
| 6:5 | W | 00 = Ignored.<br>01 = INTERRUPTON. Enables interrupt assertion for the channel.<br>10 = INTERRUPTOFF. Disables interrupt assertion for the channel.<br>11 = Ignored. |
| 8:7 | W | 00 = Ignored.<br>01 = BASEVIRTUAL. The channel translates ALL address information contained in descriptors.<br>10 = BASEPHYSICAL. The channel translates address information as specified in the descriptors.<br>11 = Ignored. |
| 10:9 | W | 00 = Ignored.<br>01 = STRONGORDER. The channel processes and completes descriptors in the order received.<br>10 = WEAKORDER. The channel processes and completes descriptors in the most efficient order.<br>11 = Ignored. |
| 13:11 | W | 000 = Ignored.<br>001 = CLIENTQUEUING mode.<br>010 = CHANNELQUEUING mode.<br>011 = DESCRIPTORSTREAM mode.<br>100 = RAMCHANNEL mode.<br>101 = FIFOCHANNEL mode.<br>110 = Ignored.<br>111 = Ignored. |
| 63:14 | W | The 16K-page frame address of the target channel block. |

After the DMA channel has been set up, the client can configure it (step 440). By configuring the DMA channel, the client is providing the HCDMA controller, for example, with address information for data structures used by the DMA channel in DMA transactions.

Although not necessary, it is advantageous to associate the storage capabilities of a HCDMA control block, such as control block 210, and a HCDMA channel block, such as channel block 212, with the I/O memory. By mapping the HCDMA controllers to I/O memory, clients can simply perform reads and writes to and from the registers of HCDMA controllers by performing reads and writes to and from I/O memory. Clients, accordingly, do not need to know how to access the HDCMA controller registers directly. With regard to configuring DMA channels, clients can write the data structure addresses directly to I/O memory.

Figure 5:
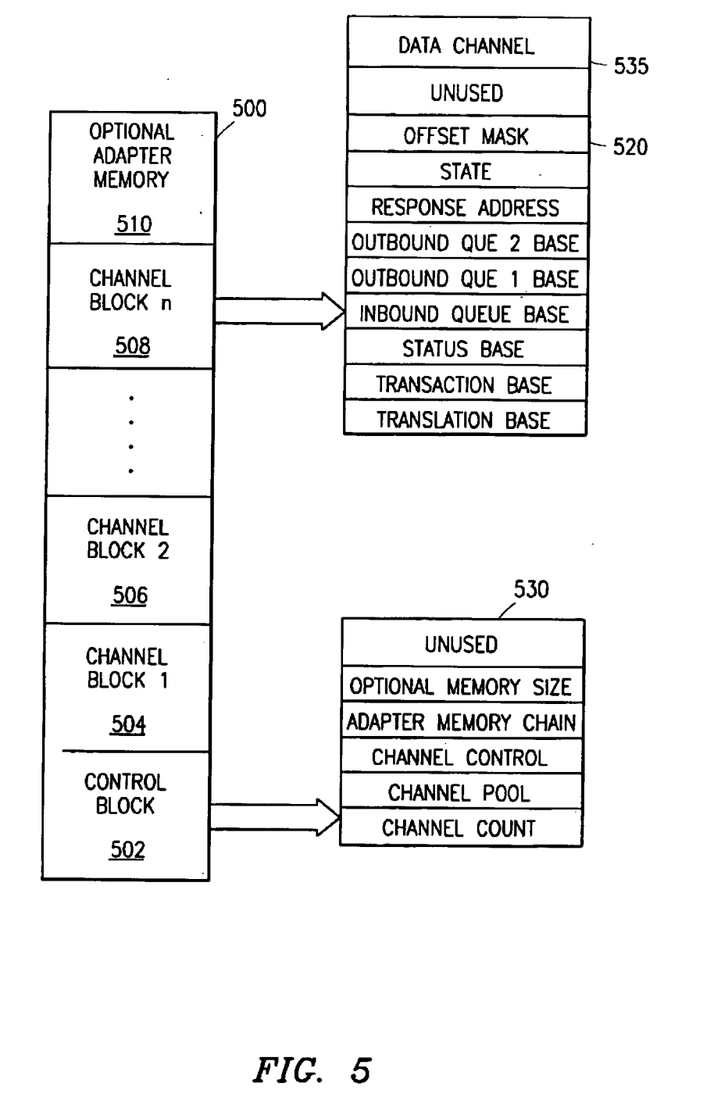
FIG. 5 illustrates an exemplary I/O memory map for an HCDMA controller.

FIG. 5 illustrates an exemplary I/O memory map of an HCDMA controller. Memory block 500 represent contiguous I/O memory. The memory block 500 includes a control block portion 502 and channel block portions 504, 506 and 508, each of which are independently programmable. The control block portion 502, for example, can be mapped to memory in the HCDMA controller's control block such as that in control block 210 (shown in FIG. 2). Furthermore, the channel block portions 504, 506 and 508 can be mapped to memory in channel blocks such as channel blocks 212, 214 and 216. The channel block 500 can also include an optional adapter memory portion 510 that would be mapped to corresponding memory in the HCDMA controller.

Channel block portion 520 is a more detailed depiction of the I/O memory channel block portion 508. Channel block portion 520, however, would be similar for channel block portions 504 and 506. Furthermore, control block portion 530 is a more detailed depiction of I/O memory control block portion 502. One skilled in the art can understand that the I/O memory map can be configured in a variety of ways and that FIG. 5 merely illustrates one of those many ways.

Referring again to the flow chart of FIG. 4, after configuring the DMA channel (step 440), i.e., after writing the appropriate information to channel block portion 520 in FIG. 5, the client requests that a DMA transaction be performed (step 445). In one embodiment, the client makes this request by writing the necessary data to a descriptor such as descriptor 605 shown in FIG. 6. Descriptor 605 is a 64-byte aligned memory region consisting of 8 quad-words. The first 6 quad-words represent the transaction portion of the descriptor and the last 2 quad-words represent the status portion of the descriptor.

Figure 6:
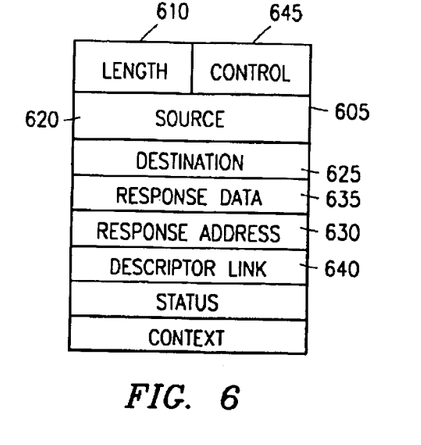
FIG. 6 illustrates a descriptor used to program HCDMA transactions.

To render a DMA transaction (step 445), the client could write to the descriptor the length of the data being transferred (field 610), the source of the data (field 620) and the destination of the data (field 625). The client can also provide a response address (field 630) and response data (field 635). With this data, after a DMA transaction is completed, the HCDMA controller can write the response data to the response address. Additionally, the client can batch multiple DMA transactions together by providing a link to another descriptor in the descriptor link field 640. Furthermore, particular control instructions for the DMA transaction can be written to a control field 645. Table 2 contains exemplary control instructions. As with Table 1, neither the particular instructions nor the offsets are meant to be limiting. One skilled in the art can appreciate that other instructions and offsets can be used.

TABLE 2

DESCRIPTOR CONTROL INSTRUCTIONS

| Bits | Label | Description |
| --- | --- | --- |
| 0 | ORD | 1 = This operation is performed after all other previously issued DMR requests. |
| 1 | CNL | 1 = Cancel this DMA operation and complete it immediately. |
| 2 | INTERROG-ATORY | 1 = Assert an interrupt upon completion of this DMA operation. |
| | SYN | 1 = Same as 'SO' but also halts the channel after completion of the DMA operation. |
| 4 | SAD | 1 = Interpret 'Source' field as data instead of as an address. |
| 5 | STS | 1 = Status requested upon completion of the DMA operation. |
| 6 | CRS | 1 = Send response to Channel Response Address upon completion of the DMA operation. |
| 7 | DRS | 1 = Send response to Descriptor Response Address upon completion of the DMA operation. |

TABLE 2-continued

DESCRIPTOR CONTROL INSTRUCTIONS

| Bits | Label | Description |
| --- | --- | --- |
| 8 | OQ1 | 1 = Reconcile descriptor to Outbound Queue1. |
| 9 | OQ2 | 1 = Reconcile descriptor to Outbound Queue2. |
| 10 | SST | 1 = Source address is static during DMA operation. Only valid when SAD = 0. |
| 11 | SIO | 1 = Source address is IO region. Only valid when SAD = 1. |
| 13:12 | SWT SUC | 00 = Source address is fully cached. Only valid when SAD = 0. 01 = Source address is write-through cache. Only valid when SAD = 0. 10 = Reserved. 11 = Source address is uncached. Only valid when SAD = 0. |
| 14 | SVA | 1 = Source address is virtual and requires translation. Only valid when SAD = 0. |
| 16:15 | S08 S16 S32 | 00 = Source address is 64-bit granularity. Only valid when SAD = 0. 01 = Source address is 08-bit granularity. Only valid when SAD - 0. 10 = Source address is 16-bit granularity. Only valid when SAD = 0. 11 = Source address is 32-bit granularity. Only valid when SAD = 0. |
| 17 | DST | 1 = Destination address is static during DMA operation. |
| 18 | DIO | 1 = Destination address is IO region. |
| 20:19 | DWT | 00 = Destination address is fully cached. 01 = Destination address is write-through cache. 10 = Reserved. 11 = Destination address is uncached. |
| 21 | DVA | 1 = Destination address is virtual and requires translation. |
| 23:22 | D08 D16 D32 | 00 = Destination address is 64-bit granularity. 01 = Destination address is 08-bit granularity. 10 = Destination address is 16-bit granularity. 11 = Destination address is 32-bit granularity. |
| 24 | RIO | 1 = Destination address is IO region. |
| 26:25 | RWT | 00 = Response address is fully cached. 01 = Response address is write-through cache. 10 = Reserved. 11 = Response address is uncached. |
| 27 | RVA | 1 = Response address is virtual and requires translation. |
| 29:28 | R08 | 00 = Response address is 64-bit granularity. 01 = Response address is 08-bit granularity. 10 = Response address is 16-bit granularity. 11 = Response address is 32-bit granularity. |
| 30 | LNK | 1 = The 'DescriptorLink' field contains a valid descriptor block number. |
| 31 | Reserved | 0 |

Referring again to FIG. 4, if the client desires further DMA transactions (step 450), branch 455 is followed and the client requests these additional DMA transactions (step 445). When no other DMA transactions are requested, branch 460 is followed and the client releases the DMA channel (step 470). This DMA channel is now free and can be acquired by other clients.

In one embodiment of the present invention, individual DMA channels can be operated in different modes. The operational mode of a particular DMA channel can be determined during DMA channel set up (step 435 of FIG. 4). For example, a channel block, such as channel block 212 shown in FIG. 2, can be initially set up to operate in a client queuing mode, a channel queuing mode, a descriptor streaming mode, a RAM channel mode or a FIFO channel mode. The client can set up the channel block in one of these modes by setting the appropriate bits, e.g., bits 11–13 as shown in Table 1, in the set up instruction issued in step 435.

Figure 7:
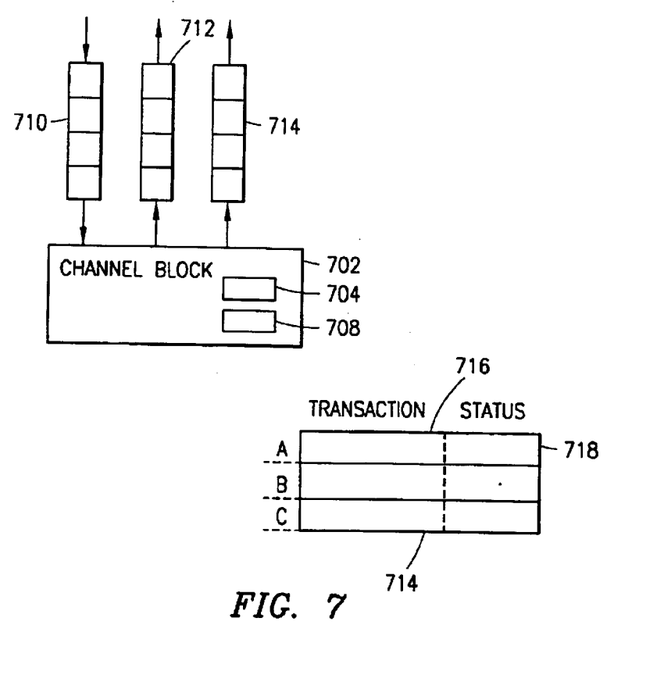
FIG. 7 represents the operation of the HCDMA in client queuing mode.

FIG. 7 illustrates an example of the HCDMA controller's client queuing mode. FIG. 7 includes a channel block 702, which can correspond to one of channel blocks 212, 214 and 216 shown in FIG. 2. Channel block 702 includes storage locations 704 and 708. These storage locations can be used to store the data written to the addresses of the I/O memory's channel block portion 520 as shown in FIG. 5. In particular, storage locations 704 and 708 can be used to store a transaction base and a status base (shown in the channel block portion 520), respectively. The stored transaction base can be used to point to a location in memory where descriptors (such as descriptor 605 shown in FIG. 6), which include the DMA transaction information, are stored. For example, the status base could point to descriptor block 714. Each transaction base can be unique for each channel block.

Similarly, the status base is used to point to a location in memory where status information about the DMA transaction should be rendered. The status base stored in storage location 708 can point to the same data structure, e.g., descriptor block 714, as does the transaction base stored in storage location 704 or the status base can point to a different data structure. In other words, the status information need not be rendered to the same data structure that provided the instructions for the DMA transaction.

In one exemplary embodiment, three queues 710, 712 and 714 are associated with the channel block 702. The location (address in memory) of these queues can be established when the DMA channel is originally configured, as in step 440 of FIG. 4. For example, the location of these queues is written to the appropriate portions of I/O memory's channel block portion 520 shown in FIG. 5. These queues can be configured as hardware FIFOs; FIFOs in host memory, FIFOs in client memory, etc.

Still referring to FIG. 7, queue 710 is an inbound queue and queues 712 and 714 are outbound queues. As one skilled in the art can appreciate, this queue configuration can be adjusted to fit particular design requirements. The three queue configuration, however, provides the HCDMA controller with, substantial versatility.

Also shown in FIG. 7 is a descriptor block 714 with three descriptor storage locations labeled A, B and C. Depending upon the needs of the client using the channel block 702, descriptor block 714 can include any number of descriptor storage locations. In one embodiment, each descriptor storage location can be 64 bytes of physically contiguous memory. Further, each descriptor storage location can be divided into two portions: a transaction portion 716 corresponding to the first six quad-words of a descriptor and a status portion 718 corresponding to the last two quad-words of a descriptor. The status portion 718 could store the status and context fields of descriptor 605 in FIG. 6.

In client queuing mode, the client acquires a free descriptor (A, B or C) and then writes DMA transaction instructions to that acquired descriptor. This procedure corresponds to step 445 in FIG. 4. In one embodiment, outbound queue 712 stores the descriptor labels, e.g., "A" and "B", for all free descriptors. That is, outbound queue 712 stores the descriptor labels corresponding to descriptor storage locations not already programed by other DMA transactions (of the same client). Thus, in this embodiment, the client acquires a free descriptor by obtaining the identity of a free descriptor from the outbound queue 712.

Once the identity of a free descriptor is obtained, the client can program (write) that descriptor. Thus, if the client acquired descriptor "B", the client could then write the necessary instructions (those fields shown in FIG. 6) to descriptor "B" in descriptor block 714.

After programing a descriptor with the DMA transaction instruction, the client places the descriptor label, such as "B", on the inbound queue 710. In the client queuing mode, the client is responsible for synchronizing access to all of the queues, including inbound queue 710. Next, the client signals the channel block 702 that a new descriptor label has been inserted onto the inbound queue 710. The channel block 702 then pulls the descriptor label from the inbound queue 710. Using that pulled descriptor label and the transaction base data stored in storage location 704, the channel block 702 locates and reads the appropriate descriptor. For example, if the channel block 702 pulled label "B" from the inbound queue 710, the channel block 702 would then use the transaction base data in storage location 704 to locate the descriptor block 714 and would use the label "B" to locate storage location B. The channel block 702 can then read the DMA transaction instruction from that descriptor storage location.

After reading the DMA transaction instruction, the channel block 702 performs the DMA transaction and renders status if requested to do so by the client. Status is only rendered if it is requested by the descriptor as programmed by the client or if the DMA channel is configured to render status. Status can be rendered to a particular address designated in the descriptor, to a location relative the status base stored in storage location 708, to outbound queue 714, etc. After the transaction is completed and status is rendered, the client can write the descriptor label, e.g., "B", to outbound queue 712—thereby indicating that descriptor "B" is free and can be acquired for other DMA transactions.

During the initial setup stage, the channel block 702 can alternatively be placed in a channel queuing mode. Channel queuing mode generally operates similarly to the client queuing mode. Channel queuing mode, however, does not need to use the inbound queue 710. Instead, after a descriptor is acquired and programmed, the client need only to write the appropriate descriptor label to the data channel 535 (shown in FIG. 5) and not to the inbound queue 710. Furthermore, in channel queuing mode, the client does not need to provide synchronization to the inbound queue and the client does not need to signal the presence of a descriptor label to the channel block 702. The channel block 702 itself takes care of these functions. The client, however, is responsible for providing synchronization to any outbound queues (712, 714) that it uses for rendering status information.

The channel block 702 can also be programed to operate in a descriptor stream mode. This mode is best suited for use by non-CPU entities, such as bus masters, which generally do not have memory for forming descriptors. Thus, to utilize the descriptor functions of the present invention, these non-CPU entities must stream descriptor information to the appropriate channel block, such as channel block 702. For example, these devices deliver one portion of a DMA transaction instruction at a time to the data channel 535 of the channel block portion 520 (shown in FIG. 5). Once the entire DMA transaction instruction is loaded into the data channel 535, the channel block generally operates as if in channel queuing mode.

In another embodiment of the present invention, channel blocks of the present invention can be configured to perform non-traditional DMA transactions. For example, a channel block can be configured to operate in a RAM channel mode. RAM channel mode provides an additional level of address translation for data transfers. Effectively, the channel block, when in RAM channel mode, acts as a memory window that points to another memory location, i.e., it provides seamless forwarding of data.

FIFO channel mode is another example of the non-traditional capabilities of the present invention. As with RAM channel mode, FIFO channel mode provides an additional level of address translation. FIFO channel mode, however, forwards and receives data from FIFOs (not shown). For example, when an application writes to the data channel 535 of a particular channel block, the channel block then forwards that information to the FIFO. Because the FIFO is a single point write, the channel block writes the information to the FIFO and ignores any page offsets associated with the data channel 535. Accordingly, CPUs can use burst operations, i.e., write to successive addresses, when they are actually writing to a FIFO. The FIFO channel, in effect, masks the FIFO from the CPU. Similarly, the channel block can read from a FIFO and write the read information to the data channel 535. The channel block will provide the offsets required to translate the single point FIFO address to the appropriate full address.

In summary, the present invention provides a method and apparatus for easily and securely rendering DMA transactions. The present invention permits clients such as user applications and non-host entities to utilize DMA transactions. These clients utilize DMA transactions by attempting to acquire one of possibly multiple DMA channels included in an HCDMA controller. Responsive to this attempt, the HCDMA controller can provide a DMA channel to the client. Accordingly, operating system intervention is not necessarily required when a client seeks to acquire a DMA channel.

Once a DMA channel is acquired, the client must set up the channel for control. For example, the client must select an operating mode, such as client queuing mode, for the DMA channel. The client can next configure the acquired DMA channel by writing to the HCDMA controller any addresses of data structures, such as the queues and the descriptor block, needed for DMA transactions. The client then programs the HCDMA controller to perform the DMA transactions or to translate addresses if the HCDMA controller is in the RAM channel mode or the FIFO channel mode. Finally, once a client no longer needs a DMA channel, the DMA channel is released—thereby freeing it for use by another client.

An exemplary embodiment of the apparatus of the present invention has been illustrated in the accompanying Drawings and described in the foregoing Detailed Description. As one skilled in the art can understand, the invention is not limited to just the embodiment disclosed. Rather, the present invention is capable of numerous rearrangements, modifications and substitutions without departing from the spirit of the invention as set forth and defined in the following claims.

What is claimed is:

1. A computer system comprising:
   a mass storage device;
   a first data transfer controller for controlling data transfers involving the mass storage device, the first data transfer controller operable in a channel free state and a channel unavailable state;
   a circuit device connected to the first data transfer controller, the circuit device for requesting a particular data transfer to be controlled by the first data transfer controller; and
   a second data transfer controller connected to the circuit device, the second data transfer controller for controlling data transfers and for controlling the particular data transfer responsive, at least, to the circuit device receiving an indication that the first data transfer controller is in the channel unavailable state.

2. The computer system of claim 1, wherein the circuit device is a non-host processor entity.

3. The computer system of claim 1, wherein the circuit device is a microprocessor.

4. The computer system of claim 1, wherein the second data transfer controller is associated with a memory address and wherein the first data transfer controller, when in the channel unavailable state, is configured to provide the circuit device with the memory address for the second data transfer controller.

5. The computer system of claim 1, wherein the first data transfer controller includes a storage device for storing an indication of whether the first data transfer controller is in the channel free state or in the channel unavailable state.

6. The computer system of claim 5, wherein the client is configured to read the indication from the storage device and further wherein responsive to the indication indicating that the first data transfer controller is in the channel unavailable state, request the particular data transfer to be controlled by the second data transfer controller.

7. The computer system of claim 1, wherein the first data transfer controller is operable in one of a client queuing mode and a channel queuing mode.

8. The computer system of claim 1, wherein the first data transfer controller is operable in a data streaming mode.

9. The computer system of claim 8, wherein the first data transfer controller is operable in one of a RAM channel mode and a FIFO channel mode.

10. The computer system of claim 1, wherein the mass storage device is a hard drive.

11. A data transfer controller for transferring data responsive to a request from a client, the data transfer controller comprising:
    a first channel circuitry for providing a first channel for data transfers, the channel circuitry operable in a plurality of modes;
    a storage device connected to the first channel circuitry, the storage device for storing an indication of a particular one of the plurality of modes; and
    a control circuitry connected to the channel circuitry, the control circuitry for controlling provision of the first channel to the client;
    wherein the channel circuitry is operable in the particular one of the plurality of modes, and wherein the first channel is configurable in a one of a client queuing mode and a channel queuing mode, and further wherein the storage device is for storing an indication that the first channel is in one of the client queuing mode and the channel queuing mode.

12. A data transfer controller for transferring data responsive to a request from a client, the data transfer controller comprising:
    a first channel circuitry for providing a first channel for data transfers, the channel circuitry operable in a plurality of modes;
    a storage device connected to the first channel circuitry, the storage device for storing an indication of a particular one of the plurality of modes; and
    a control circuitry connected to the channel circuitry, the control circuitry for controlling provision of the first channel to the client;
    wherein the channel circuitry is operable in the particular one of the plurality of modes, and wherein the first channel is configurable in a descriptor stream mode.

13. The data transfer controller of claim 11 included in a memory controller.

14. A DMA controller comprising:
   a first channel device for performing in a first DMA transaction, the first channel device operable in a first mode; and
   a second channel device for performing a second DMA transaction, the second channel device operable in a second mode;
   a first address translation mechanism associated with the first channel device; and
   a second address translation mechanism associated with the second channel device, the second address translation mechanism operable independent of the first address translation mechanism;
   wherein the first mode and the second mode are different and wherein the first DMA transaction and the second DMA transaction are different.

15. The DMA controller of claim 14, further comprising a control device connected to the first channel device and the second channel device, the control device for controlling an acquisition of the first channel device responsive to a request for a DMA transaction from a client.

16. The DMA controller of claim 14, wherein the first mode is one of client queuing mode and channel queuing mode.

17. The DMA controller of claim 14, wherein the second mode is one of descriptor stream mode, FIFO channel mode and RAM channel mode.

18. A computer system comprising:
   a mass storage means;
   a first data transfer means for controlling data transfers involving the mass storage means, the first data transfer means operable in a channel free state and a channel unavailable state;
   a logical means connected to the first data transfer means, the logical means for requesting a particular data transfer to be controlled by the first data transfer means; and
   a second data transfer means connected to the logical means, the second data transfer means for controlling data transfers and for controlling the particular data transfer responsive, at least, to the logical means receiving an indication that the first data transfer means is in the channel unavailable state.

19. The computer system of claim 18, wherein the second data transfer means is associated with a memory address and wherein the first data transfer means, when in the channel unavailable state, is configured to provide the logical means with the memory address for the second data transfer means.

20. The computer system of claim 18, wherein the first data transfer means includes a storage means for storing an indication of whether the first data transfer means is in the channel free state or in the channel unavailable state.

21. The computer system of claim 20, wherein the client is configured to read the indication from the storage means and further wherein responsive to the indication indicating that the first data transfer means is in the channel unavailable state, request the particular data transfer to be controlled by the second data transfer means.

22. The computer system of claim 18, wherein the first data transfer means is operable in one of a client queuing mode and a channel queuing mode.

23. The computer system of claim 18, wherein the first data transfer means is operable in a data streaming mode.

24. The computer system of claim 23, wherein the first data transfer means is operable in one of a RAM channel mode and a FIFO channel mode.

25. A method for transferring data using a controller including a channel, the channel being operable in a plurality of data transfer modes, the method comprising the steps of:
   requesting control of the channel;
   responsive to receiving control of the channel, configuring the channel to be operable in a particular one of the plurality of modes; and
   requesting data to be transferred through the channel, wherein the plurality of data transfer modes includes FIFO channel mode and RAM channel mode.

26. The method of claim 25, further comprising the step of releasing the control of the channel.

27. A method for transferring data using a controller including a channel, the channel being operable in a plurality of data transfer modes, the method comprising the steps of:
   requesting control of the channel;
   responsive to receiving control of the channel, configuring the channel to be operable in a particular one of the plurality of modes; and
   requesting data to be transferred through the channel, wherein the plurality of data transfer modes includes a software queuing mode and a client queuing mode.

28. A method for transferring data using a controller including a channel, the channel being operable in a plurality of data transfer modes, the method comprising the steps of
   requesting control of the channel;
   responsive to receiving control of the channel, configuring the channel to be operable in a particular one of the plurality of modes; and
   requesting data to be transferred through the channel, wherein the plurality of data transfer modes includes a descriptor streaming mode.

* * * * *